July 18, 1933.  C. B. WELLS ET AL  1,918,944
SCREW DRIVER ATTACHMENT
Filed March 23, 1933
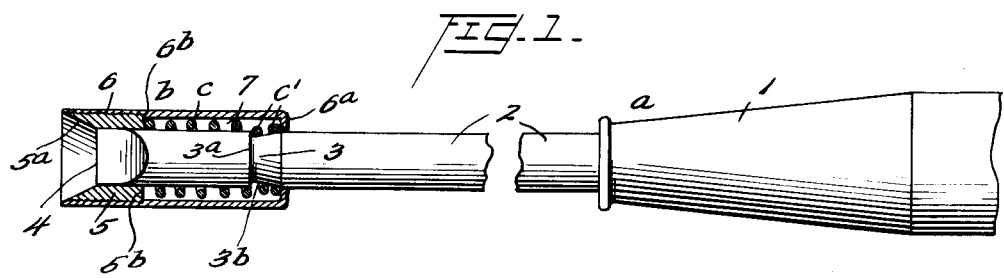
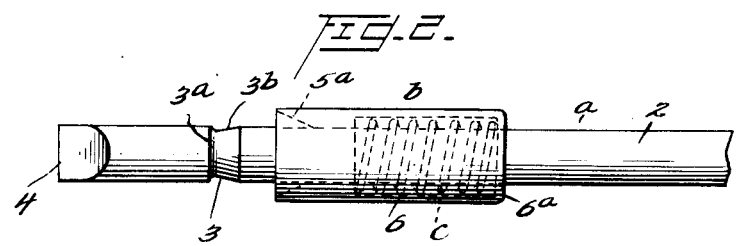
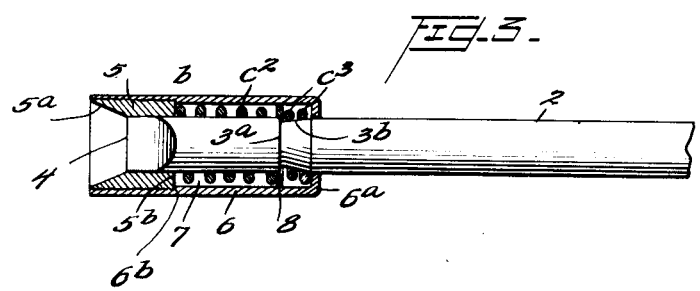
Inventor
Cyrus B. Wells
Lud G. Sylvester
By Robert Watson
Attorney Patented July 18, 1933

1,918,944

UNITED STATES PATENT OFFICE

CYRUS B. WELLS AND LOUIS G. SYLVESTER, OF SCRANTON, PENNSYLVANIA

SCREW DRIVER ATTACHMENT

Application filed March 23, 1933. Serial No. 662,360.

This invention relates to a screw driver attachment for guiding the pointed end of the screw driver shank and keeping it in engagement with the kerfs of the screws. The purpose of the invention is to provide a simple and inexpensive device of this kind which cannot readily be removed from the screw driver shank but which can be pushed backwardly on the shank out of the way when it is desired to use the screw driver without using the attachment. In carrying out the invention, we form a shallow annular recess in the screw driver shank, near its forward end, and provide a sleeve slidable upon the shank and having a flaring forward end adapted to engage the screw heads at their peripheries. This sleeve has an internal annular recess with shoulders at its forward and rear ends, forming, with the shank, an annular chamber which houses a spring for pressing the sleeve forward on the shank into position to engage the screw heads. In the preferred form of the invention, this spring has one or two convolutions, at one end, of smaller diameter than the body of the spring and these convolutions fit in the recess in the shank and hold the spring frictionally against longitudinal displacement on the shank. The body of the spring extends forward from these contracted convolutions and presses the sleeve toward the forward end of the shank, while the contracted end of the spring serves as a stop to limit the forward movement of the sleeve. At times it may be desirable to use the screw driver without utilizing the sleeve as a guide, and in such cases the sleeve may be pushed back on the shank out of the way, the contracted convolutions of the spring expanding as the sleeve is pushed backwardly out of the recess in the shank and serving to frictionally hold the attachment at the place on the shank to which it is moved. The form of the recess in the shank is such that the contracted convolutions of the spring cannot be moved forwardly out of the recess in the shank except by applying considerable force, and hence the attachment cannot accidentally become detached from the shaft and cannot be removed except by the application of considerable force. Instead of making the contracted convolutions integral with the body of the spring, they may be separate and serve the same purpose, as hereinafter explained.

In the accompanying drawing,

Fig. 1 is a side view of a screw driver, partly broken away, the attachment being shown in its normal position in longitudinal central section;

Fig. 2 is a side view of the screw driver shank, partly broken away, showing the attachment in side view moved backward on the shank from its normal position, and, Fig. 3 is a side view of a screw driver shank and a longitudinal section through the attachment, showing a modification of the coils therein.

Referring to Figs. 1 and 2 of the drawing, a represents a screw driver comprising a handle 1 and a metal shank 2, of usual construction except for the provision of a shallow annular recess 3 in the shank a short distance back of its pointed end 4. The recess is formed with a relatively abrupt shoulder 3ª on the side nearest the pointed end of the shank and from this shoulder rearwardly the bottom wall 3ᵇ of the recess is slightly conical, inclining gradually outward to the periphery of the shank.

The sleeve b preferably comprises a metal bushing 5, slidable on the shank and fitted tightly within one end of a metal tube 6 against a shoulder 6ᵇ. The forward end of the bushing flares outwardly from the shank of the screw driver, as shown at 5ª, so that it may engage the peripheries of screw heads of different diameters, and the rear end of the bushing is at right angles to the axis of the bushing in order to provide a shoulder, as shown at 5ᵇ, against which one end of a compression spring c may abut. For easy assembly of the parts 5 and 6, the bushing is roughly knurled and the tube 6 is applied with a driving fit. The tube extends from the forward end of the bushing to a considerable distance beyond its rear end, and the rear end of the tube is formed with an inwardly extending flange 6ª and has a central opening fitting freely around the shank. Thus, an annular recess 7 is formed in the sleeve b, between the shoulder 5ᵇ and the flange 6ª, which constitutes a shoulder, and in this recess in the sleeve is arranged a helical compression spring c which bears at one end against the shoulder 5ᵇ and has at its opposite end two convolutions c', of smaller diameter than those in the body of the spring, fitting within the annular recess 3 in the screw driver shank. These contracted convolutions hold the spring frictionally against longitudinal displacement on the shank, and as the recess 3 is shallow and of less depth than the thickness of the wire of which the spring is formed, the contracted convolutions project outward slightly beyond the peripheral surface of the shank and serve as a stop, adapted to be engaged by the inturned shoulder 6ª of the sleeve, to limit the forward movement of the sleeve on the shank. While two contracting convolutions of the coil are shown, a single convolution will answer the purpose.

When the screw driver is used with the attachment in normal position, as shown in Fig. 1, the lower end of the sleeve fits around the screw head and prevents the end of the driver from slipping out of the kerf in the screw head. As the screw enters the object into which it is being driven, the sleeve rests against the object and is caused to recede on the shank. When the driver is withdrawn from the screw head, the compression spring returns the sleeve to normal position.

When it is desired to use the screw driver without using the sleeve as a guide, the sleeve may be pushed backward on the shank, the convolutions 6ª of the spring expanding as they are pressed back over the conical surface 3ᵇ and these convolutions serve to frictionally hold the sleeve in any position on the shank, as illustrated in Fig. 2. It is often desirable to use the screw driver without the attachment, and if the attachment was made readily removable for this purpose it might be taken off and become lost. The construction described makes it possible to move the sleeve backward out of the way, obviating the necessity for its removal, and it further makes removal of the sleeve difficult by reason of the engagement of the contracted convolutions of the spring with the abrupt shoulder 3ª, so that the sleeve cannot become accidently detached.

In Fig. 3, the parts are the same as in the previously described figures, except that the coil $c^2$ and the contracted convolutions $c^3$ are not connected, but are different parts, separated by a flat ring or washer 8, the internal diameter of which is slightly greater than the diameter of the shank and the external of which is slightly less than that of the interior of the tube 6, so that the ring can slide on the shank and engage both the coil $c^2$ and the adjacent convolutions $c^3$. Evidently the convolutions $c^3$ will form a stop for the end 6ª of the sleeve to limit the forward movement of the sleeve and they will also prevent rearward displacement of the coil when the device is in use. Also, if sufficient force is applied to the sleeve, it may be pushed backward on the shank, as in Fig. 2, the coil $c^2$, when compressed tightly against the washer 8, causing the latter to force the contracted convolutions $c^3$ out of the recess in the shank, and these convolutions will then hold the parts frictionally against movement on the shank, out of the way of the screw driver point. Convolutions $c^3$ are the equivalent of a split ring and a split ring may be substituted for these convolutions, although we prefer to use a coil of spring wire, as shown.

In both forms of the invention the sleeve is revoluble with respect to the shank. Hence the operator can, if desired, hold the sleeve stationary against the screw head with one hand and turn the shank with the other hand. Also, it is to be noted that the spring, in both forms, is entirely encased by the sleeve.

What we claim is:

1. The combination with a screw driver shank having an annular recess near its forward end, of a sleeve slidable on the shank for engaging the screw heads, said sleeve having an internal recess and front and rear shoulders at the ends thereof, a helical compression spring in said recess engaging said front shoulder, and an expansible part fitting within the recess in the shank and frictionally holding the rear end of the spring against longitudinal displacement on the shank.

2. The combination with a screw driver shank having an annular recess near its forward end, of a sleeve slidable on the shank for engaging the screw heads, said sleeve having an internal recess and front and rear shoulders at the ends thereof, a helical compression spring in said recess engaging said front shoulder, and an expansible part fitting within the recess in the shank and frictionally holding the rear end of the spring against longitudinal displacement on the shank, said part serving as a stop adapted to be engaged by the rear shoulder of the sleeve, to limit the forward movement of the sleeve.

3. The combination with a screw driver shank having an annular recess near its forward end, of a sleeve slidable on the shank, for engaging the screw heads, said sleeve having an internal recess and front and rear shoulders at the ends thereof, and a helical compression spring within the latter recess extending between said shoulders and having a contracted convolution at its rear end extending into the recess in the shank.

4. The combination with a screw driver shank having a shallow annular recess near its forward end, the wall of said recess being relatively abrupt on the forward side and sloping thence rearwardly to the periphery of the shank, of a sleeve slidable on the shank, for engaging the screw heads, said sleeve having an internal recess and front and rear shoulders at the ends thereof, and a helical compression spring within the latter recess extending between said shoulders and having a contracted convolution at its rear end extending into the recess in the shank.

5. The combination with a screw driver shank having a shallow annular recess near its forward end, the wall of said recess being relatively abrupt on the forward side and sloping thence rearward to the periphery of the shank, of a sleeve slidable on the shank for engaging screw heads, said sleeve having an internal recess and front and rear shoulders at the ends thereof, a helical compression spring within the latter recess bearing against the front shoulder, an expansible coil fitting within the recess in the shank and a ring, slidable on the shank, interposed between said spring and coil.

CYRUS B. WELLS.
LOUIS G. SYLVESTER.